(12) United States Patent
Du (10) Patent No.: US 9,373,206 B2
(45) Date of Patent: Jun. 21, 2016

(54) DEVICE, SYSTEM AND METHOD FOR NON-CONTACT SECURITY INFORMATION INTERACTION

(75) Inventor: Bing Yi Du, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 198 days.

(21) Appl. No.: 14/344,599

(22) PCT Filed: Sep. 14, 2012

(86) PCT No.: PCT/CN2012/081378
§ 371 (c)(1),
(2), (4) Date: Oct. 13, 2014

(87) PCT Pub. No.: WO2013/037301
PCT Pub. Date: Mar. 21, 2013

(65) Prior Publication Data
US 2015/0137940 A1    May 21, 2015

(30) Foreign Application Priority Data
Sep. 15, 2011    (CN) .......................... 2011 1 0273983

(51) Int. Cl.
*G07C 9/00* (2006.01)
*G06K 17/00* (2006.01)
(Continued)

(52) U.S. Cl.
CPC ........ *G07C 9/00111* (2013.01); *G06K 17/0022* (2013.01); *G06Q 20/341* (2013.01); *G06Q 20/3552* (2013.01); *G06Q 20/3574* (2013.01); *G07F 7/0893* (2013.01); *G07F 7/1008* (2013.01)

(58) Field of Classification Search
CPC .. G07C 9/00; G07C 9/00309; G07C 9/00111; H04B 5/0081; B60R 25/24
USPC ...................... 340/5.61–5.67; 701/2; 307/104
See application file for complete search history.

(56) References Cited

U.S. PATENT DOCUMENTS

| | | | |
|---|---|---|---|
| 2005/0171982 A1 | 8/2005 | Deo et al. | |
| 2015/0026770 A1* | 1/2015 | Jian | G06Q 20/401 726/3 |

FOREIGN PATENT DOCUMENTS

| | | |
|---|---|---|
| CN | 101359413 A | 2/2009 |
| CN | 101441722 A | 5/2009 |

(Continued)

OTHER PUBLICATIONS

Translation of first Chinese Office Action (Chinese Application No. 2011102739832).

(Continued)

*Primary Examiner* — Allen T Cao
(74) *Attorney, Agent, or Firm* — Blakely Sokoloff Taylor & Zafman LLP (57) ABSTRACT

The present invention proposes the device, system and method used for the non-contact security information interaction. Said system used for the non-contact security information interaction comprises: a terminal for setting a parameter configuration in a non-contact IC card programmable read-write device, and initiating an information interaction with a server and said non-contact IC card programmable read-write device; and a non-contact IC card programmable read-write device for performing communication with a non-contact IC card and said terminal based on a predetermined parameter configuration in order to complete the security information interaction. The device, system and method used for the non-contact security information interaction disclosed in the present invention realize the support and selection for the multi-application on the non-contact IC card programmable read-write device, and can execute the on-line based application.

19 Claims, 2 Drawing Sheets

(51) Int. Cl.
*G06Q 20/34* (2012.01)
*G07F 7/08* (2006.01)
*G07F 7/10* (2006.01)

(56) References Cited

FOREIGN PATENT DOCUMENTS

| | | |
|---|---|---|
| JP | 11-296629 | 10/1999 |
| WO | WO-2007038743 A2 | 4/2007 |

OTHER PUBLICATIONS

Supplementary Search Report in EP Application No. 12 83 1134 dated Feb. 12, 2015. 6 pages.

English Translation of a Taiwanese Office Action, Taiwanese Application No. 101133501.

\* cited by examiner

DEVICE, SYSTEM AND METHOD FOR NON-CONTACT SECURITY INFORMATION INTERACTION

FIELD OF THE INVENTION

The present invention relates to the device, system and method used for security information interactive, and more particularly, to the device, system and method used for the non-contact security information interaction.

BACKGROUND

Nowadays, with the increasingly widespread of the non-contact IC card applications and increasingly enrichment of business types of different fields, the device, system and method used for the non-contact security information (i.e., the information requiring a higher security, such as a password) interaction become more and more important.

In the existing non-contact security information interactive system, the non-contact IC card read-write devices are classified into the non-programmable read-write device and the programmable read-write device (also referred to as "smart read-write device"). Said non-programmable read-write device itself does not have a business processing ability, and only serves to deliver information between a terminal and a card, and the terminal need to exchange multi pieces of instructions with the card by means of the read-write device when the non-programmable read-write device will complete a transaction. Because the read-write device and the terminal adopt the serial port to perform communication with each other, and thus the speed is slower, therefore, the entire transaction speed is affected. Said programmable read-write device itself has the business processing ability, and the existing programmable read-write device is mainly used for processing an off-line transaction. When the off-line transaction is accepted, after the terminal sends the instruction to the read-write device, the entire business logics are integrated in the read-write device, only the read-write device and the card need to exchage information with each other in the transaction, and the read-write device feed the transaction result back to the terminal. The read-write device only can perform one two-way interaction with the terminal during the entire transaction. However, with the development of business, there has been a demand to process both off-line and on-line businesses on the programmable read-write device. For the on-line business, the read-write device itself also needs to have the logic processing ability to increase the transaction processing speed, and its own business flow requires the read-write device to be capable of interacting with the terminal more than once.

The existing non-contact IC card programmable read-write device (e.g. the IC card reader-writer) only supports one type of business applications (for example, only supports the quick debit/credit (qPBOC) non-contact payment), that is, the non-contact IC card programmable read-write device can only configure one set of application parameters corresponding to said business application, and during the security information interaction, said non-contact IC card programmable read-write device only supports one information interaction with the terminal (e.g. a financial terminal).

Thereby, the existing non-contact security information interactive system and method have the following problems: (1) the multi-application based parameter configuration can not be achieved on said non-contact IC card programmable read-write device; and (2) said non-contact security information interactive system and method do not support the on-line based application (e.g. the on-line business adopting the non-contact debit/credit payment mode) required to perform the information interaction with a server, that is, the terminal can not return the on-line processing result back to said non-contact IC card programmable read-write device.

Therefore, with the increasingly enrichment of business types of different fields, there exists the following requirement: providing a system and method used for the non-contact security information interaction, which support multi-applications, especially the on-line based applications (e.g. supporting the non-contact debit/credit payment mode), in particular, providing a non-contact IC card programmable read-write device supporting multi-applications, especially the on-line based applications.

SUMMARY OF THE INVENTION

In order to solve the problems presented in the existing technical solution described above, the present invention proposes a device, system and method used for the non-contact security information interaction.

The objects of the present invention are realized through the following technical solutions:

A system used for the non-contact security information interaction, said system used for the non-contact security information interaction comprising:

a terminal for setting the parameter configuration in a non-contact IC card programmable read-write device, and initiating an information interaction with a server and said non-contact IC card programmable read-write device; and a non-contact IC card programmable read-write device for performing the communication with a non-contact IC card and said terminal based on a predetermined parameter configuration in order to complete the security information interaction.

In the solutions disclosed above, preferably, said parameter configuration corresponds to at least two applications.

In the solutions disclosed above, preferably, one of said at least two applications is an on-line based application.

In the solutions disclosed above, preferably, said non-contact IC card programmable read-write device is capable of performing the information interaction with said terminal more than once.

In the solutions disclosed above, preferably, said non-contact IC card programmable read-write device and said terminal use processing flow identification numbers to identify each of information data processing sub-flows executed in said non-contact IC card programmable read-write device and said terminal.

In the solutions disclosed above, preferably, said non-contact IC card programmable read-write device and said terminal complete the business logic judgement associated with said at least one application and the information interaction between each other based on said processing flow identification numbers.

In the solutions disclosed above, preferably, said terminal further comprises:

a parameter setting module for sending a parameter setting instruction to said non-contact IC card programmable read-write device, so as to set the parameter configuration in said non-contact IC card programmable read-write device; and a business executing module for sending an information interaction request to said server and said non-contact IC card programmable read-write device, so as to execute the business flow corresponding to said at least one application.

In the solutions disclosed above, preferably, said business executing module is further used to select the used application based on a candidate application list from said non-contact IC card programmable read-write device when there are more than one applications, and to transmit the application identifications corresponding to said applications back to said non-contact IC card programmable read-write device.

In the solutions disclosed above, preferably, said business executing module is further used to execute an on-line processing when the used application is an on-line based application, and to transmit the on-line processing result to said non-contact IC card programmable read-write device.

In the solutions disclosed above, preferably, said non-contact IC card programmable read-write device further comprises:

a parameter configuring module for analyzing the received parameter setting instruction, and completing the setting of said parameter configuration based on the analyzing result; and a business processing module for analyzing the received information interaction request, and executing the business flow corresponding to said at least one application based on the analyzing result.

In the solutions disclosed above, preferably, said parameter configuring module further comprises:

a parameter deleting unit for determining the mode of a deleting operation when said analyzing result for said parameter setting instruction indicates that the operation type is the deleting operation, and completing the deleting operation based on the determining result; and a parameter adding unit for completing an adding operation based on said analyzing result when said analyzing result for said parameter setting instruction indicates that the operation type is the adding operation.

In the solutions disclosed above, preferably, said parameter deleting unit is further used to delete the application identifications of the same application type when the mode of said deleting operation is the same type mode.

In the solutions disclosed above, preferably, said parameter deleting unit is further used to delete single application identification when the mode of said deleting operation is a single mode.

In the solutions disclosed above, preferably, said parameter adding unit is further used to determine whether there are any other subsequent parameters based on said analyzing result for said parameter setting instruction, and to add the other subsequent parameters if there are said other subsequent parameters.

In the solutions disclosed above, preferably, said parameter adding unit is further used to determine whether there are any other parameters customized by the equipment manufacturers based on said analyzing result for said parameter setting instruction, and to add the other parameters customized by the equipment manufacturers if there are said other parameters customized by the equipment manufacturers.

In the solutions disclosed above, preferably, said business executing module further comprises:

a preprocessing unit for determining whether there are more than one applications based on the analyzing result for the received information interaction request, and if there are more than one applications, then said preprocessing unit transmits said candidate application list back to said terminal; and a business processing unit for executing the corresponding business flow based on the application identifications corresponding to the used application from said terminal and determining the application type information, and transmitting said application type information to said terminal.

In the solutions disclosed above, preferably, said business processing unit is further used to execute an off-line business flow when said application type information indicates that the used application is an off-line application, and to transmit the executing result back to said terminal.

In the solutions disclosed above, preferably, said business processing unit is further used to execute an on-line business flow based on the on-line processing result from said terminal when said application type information indicates that the used application is an on-line based application, and to transmit the executing result back to said terminal.

In the solutions disclosed above, preferably, at least one of said processing flow identification numbers is associated with the type of said at least one application.

The objects of the present invention can also be realized through the following technical solutions:

A terminal used for the non-contact security information interaction, said terminal further comprising:

a parameter setting module for sending a parameter setting instruction to a non-contact IC card programmable read-write device, so as to set the parameter configuration in said non-contact IC card programmable read-write device; and a business executing module for sending an information interaction request to a server and said non-contact IC card programmable read-write device, so as to execute the business flow corresponding to said at least one application.

In the solutions disclosed above, preferably, said business executing module is further used to select the used application based on a candidate application list from said non-contact IC card programmable read-write device when there are more than one applications, and to transmit the application identification corresponding to said application back to said non-contact IC card programmable read-write device.

In the solutions disclosed above, preferably, said business executing module is further used to execute an on-line processing when the used application is an on-line based application, and to transmit the on-line processing result to said non-contact IC card programmable read-write device.

The objects of the present invention can also be realized through the following technical solutions:

A non-contact IC card programmable read-write device, characterized in that, said non-contact IC card programmable read-write device further comprising:

a parameter configuring module for analyzing the received parameter setting instruction, and completing the setting of a parameter configuration based on the analyzing result; and a business processing module for analyzing the received information interaction request, and executing a business flow corresponding to at least one application based on the analyzing result and a predetermined parameter configuration.

In the solutions disclosed above, preferably, said parameter configuring module further comprises:

a parameter deleting unit for determining the mode of a deleting operation when said analyzing result for said parameter setting instruction indicates that the operation type is the deleting operation, and completing the deleting operation based on the determining result; and a parameter adding unit for completing an adding operation based on said analyzing result when said analyzing result for said parameter setting instruction indicates that the operation type is the adding operation.

In the solutions disclosed above, preferably, said parameter deleting unit is further used to delete the application identifications of the same application type when the mode of said deleting operation is the same type mode.

In the solutions disclosed above, preferably, said parameter deleting unit is further used to delete single application identification when the mode of said deleting operation is a single mode.

In the solutions disclosed above, preferably, said parameter adding unit is further used to determine whether there are any other subsequent parameters based on said analyzing result for said parameter setting instruction, and to add the other subsequent parameters if there are said other subsequent parameters.

In the solutions disclosed above, preferably, said parameter adding unit is further used to determine whether there are any other parameters customized by the equipment manufacturers based on said analyzing result for said parameter setting instruction, and to add the other parameters customized by the equipment manufacturers if there are said other parameters customized by the equipment manufacturers.

In the solutions disclosed above, preferably, said business executing module further comprises:

a preprocessing unit for determining whether there are more than one applications based on the analyzing result for the received information interaction request, and if there are more than one applications, then said preprocessing unit transmits said candidate application list back to said terminal; and a business processing unit for executing the corresponding business flow based on the application identifications corresponding to the used application from said terminal and determining the application type information, and transmitting said application type information to said terminal.

In the solutions disclosed above, preferably, said business processing unit is further used to execute an off-line business flow when said application type information indicates that the used application is an off-line application, and to transmit the executing result back to said terminal.

In the solutions disclosed above, preferably, said business processing unit is further used to execute an on-line business flow based on the on-line processing result from said terminal when said application type information indicates that the used application is an on-line based application, and to transmit the executing result back to said terminal.

In the solutions disclosed above, preferably, at least one of said processing flow identification numbers is associated with the type of said at least one application.

The objects of the present invention can also be realized through the following technical solutions:

A method used for the non-contact security information interaction, said method used for the non-contact security information interaction comprising the following steps:

(A1) a terminal setting the parameter configuration in a non-contact IC card programmable read-write device;

(A2) said terminal initiating an information interaction with a server and said non-contact IC card programmable read-write device; and (A3) said non-contact IC card programmable read-write device performing the communication with a non-contact IC card and said terminal based on a predetermined parameter configuration in order to complete the security information interaction.

In the solutions disclosed above, preferably, said parameter configuration corresponds to at least two applications.

In the solutions disclosed above, preferably, one of said at least two applications is an on-line based application.

In the solutions disclosed above, preferably, said non-contact IC card programmable read-write device is capable of performing the information interaction with said terminal more than once.

In the solutions disclosed above, preferably, said non-contact IC card programmable read-write device and said terminal use processing flow identification numbers to identify each of information data processing sub-flows executed in said non-contact IC card programmable read-write device and said terminal.

In the solutions disclosed above, preferably, said non-contact IC card programmable read-write device and said terminal complete a business logic judgement associated with said at least one application and the information interaction between each other based on said processing flow identification numbers.

In the solutions disclosed above, preferably, said step (A1) further comprises: said terminal sending a parameter setting instruction to said non-contact IC card programmable read-write device, so as to set the parameter configuration in said non-contact IC card programmable read-write device.

In the solutions disclosed above, preferably, said step (A2) further comprises: said terminal sending an information interaction request to said server and said non-contact IC card programmable read-write device, so as to execute the business flow corresponding to said at least one application.

In the solutions disclosed above, preferably, said step (A2) further comprises: selecting the used application based on a candidate application list from said non-contact IC card programmable read-write device when there are more than one applications, and transmitting the application identification corresponding to said application back to said non-contact IC card programmable read-write device.

In the solutions disclosed above, preferably, said step (A2) further comprises: executing an on-line processing when the used application is an on-line based application, and transmitting the on-line processing result to said non-contact IC card programmable read-write device.

In the solutions disclosed above, preferably, said step (A3) further comprises:

(B1) said non-contact IC card programmable read-write device analyzing the received parameter setting instruction, and completing the setting of said parameter configuration based on the analyzing result; and (B2) said non-contact IC card programmable read-write device analyzing the received information interaction request, and executing the business flow corresponding to said at least one application based on the analyzing result.

In the solutions disclosed above, preferably, said step (B1) further comprises:

(C1) determining the mode of a deleting operation when said analyzing result for said parameter setting instruction indicates that the operation type is the deleting operation, and completing the deleting operation based on the determining result; and (C2) completing an adding operation based on said analyzing result when said analyzing result for said parameter setting instruction indicates that the operation type is the adding operation.

In the solutions disclosed above, preferably, said step (C1) further comprises: deleting the application identifications of the same application type when the mode of said deleting operation is the same type mode.

In the solutions disclosed above, preferably, said step (C1) further comprises: deleting single application identification when the mode of said deleting operation is a single mode.

In the solutions disclosed above, preferably, said step (C2) further comprises: determining whether there are any other subsequent parameters based on said analyzing result for said parameter setting instruction, and adding the other subsequent parameters if there are said other subsequent parameters.

In the solutions disclosed above, preferably, said step (C2) further comprises: determining whether there are any other parameters customized by the equipment manufacturers based on said analyzing result for said parameter setting instruction, and adding the other parameters customized by the equipment manufacturers if there are said other parameters customized by the equipment manufacturers.

In the solutions disclosed above, preferably, said step (B2) further comprises:

(D1) determining whether there are more than one applications based on the analyzing result for the received information interaction request, and if there are more than one applications, then transmitting said candidate application list back to said terminal; and (D2) executing the corresponding business flow based on the application identifications corresponding to the used application from said terminal and determining an application type information, and transmitting said application type information to said terminal.

In the solutions disclosed above, preferably, said step (D2) further comprises: executing an off-line business flow when said application type information indicates that the used application is an off-line application, and transmitting the executing result back to said terminal.

In the solutions disclosed above, preferably, said step (D2) further comprises: executing an on-line business flow based on the on-line processing result from said terminal when said application type information indicates that the used application is an on-line based application, and transmitting the executing result back to said terminal.

In the solutions disclosed above, preferably, at least one of said processing flow identification numbers is associated with the type of said at least one application.

The device, system and method used for the non-contact security information interaction disclosed in the present invention have the following advantages: due to the adoption of the variable parameter configuration mode, multi-applications parameter configuration on the non-contact IC card programmable read-write device is realized; due to the use of the process flow identification numbers, the support and selection of the multi-applications is realized on the non-contact IC card programmable read-write device; and, since it enables the non-contact IC card programmable read-write device to be interact with the terminal more than once by using the process flow identification numbers, not only the off-line application can be executed, and on-line based application can also be executed (for example, the on-line PIN input can be realized).

BRIEF DESCRIPTION OF THE DRAWINGS

The technical features and advantages of the present invention will be better appreciated by one skilled in the art in conjunction with the accompanying drawings, in which.

DETAILED DESCRIPTION OF THE INVENTION

Figure 1:
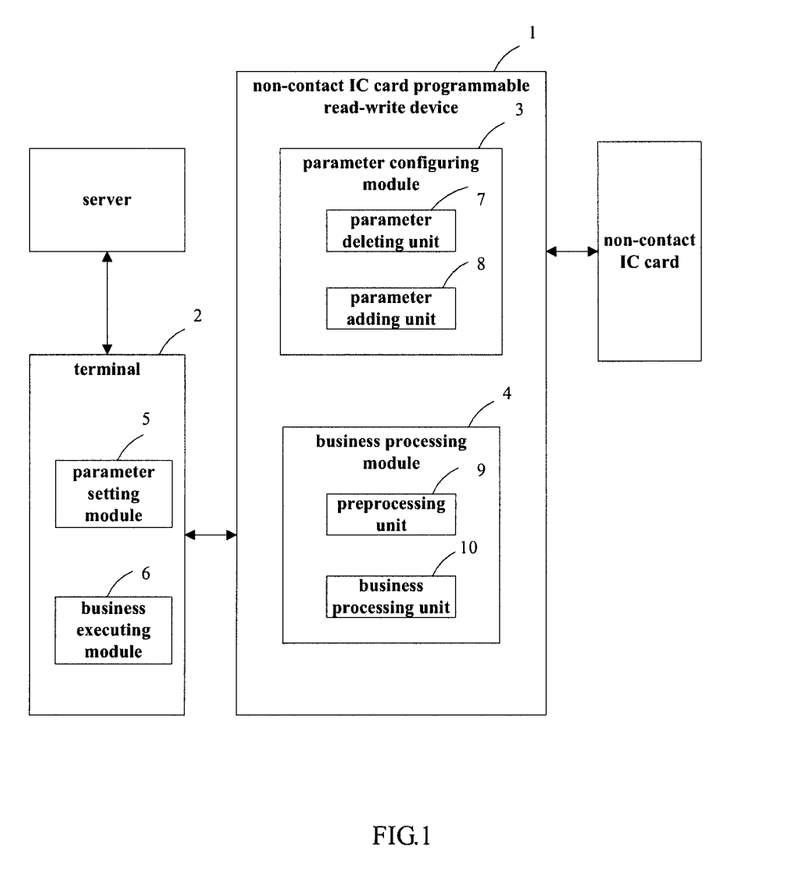
FIG. 1 is a schematic structure diagram of the non-contact IC card programmable read-write device and the system used for the non-contact security information interaction according to an embodiment of the present invention.

FIG. 1 is a schematic structure diagram of the system used for the non-contact security information interaction according to an embodiment of the present invention. As shown in FIG. 1, the system used for the non-contact security information interaction disclosed in the present invention comprises a non-contact IC card programmable read-write device 1 and a terminal 2. Said terminal 2 is used to set the parameter configuration in said non-contact IC card programmable read-write device 1, and to initiate the information interaction with a server and said non-contact IC card programmable read-write device 1. Said non-contact IC card programmable read-write device 1 is used to perform communication with a non-contact IC card and said terminal 2 based on a predetermined parameter configuration in order to complete the security information interaction.

Preferably, in the system used for the non-contact security information interaction disclosed in the present invention, said parameter configuration corresponds to at least one application.

Exemplarily, in the system used for the non-contact security information interaction disclosed in the present invention, said parameter configuration corresponds to at least two applications.

Exemplarily, in the system used for the non-contact security information interaction disclosed in the present invention, one of said at least two applications is an on-line based application (e.g. a non-contact debit/credit payment application).

Preferably, in the system used for the non-contact security information interaction disclosed in the present invention, said non-contact IC card programmable read-write device 1 is capable of performing the information interaction with said terminal 2 more than once.

Preferably, in the system used for the non-contact security information interaction disclosed in the present invention, said non-contact IC card programmable read-write device 1 and said terminal 2 use processing flow identification numbers to identify each of information data processing sub-flows executed in said non-contact IC card programmable read-write device 1 and said terminal 2.

Preferably, in the system used for the non-contact security information interaction disclosed in the present invention, said non-contact IC card programmable read-write device 1 and said terminal 2 complete the business logic judgement associated with said at least one application and the information interaction between each other based on said processing flow identification numbers.

As shown in FIG. 1, in the system used for the non-contact security information interaction disclosed in the present invention, said terminal 2 further comprises a parameter setting module 5 and a business executing module 6. Said parameter setting module 5 is used to send a parameter setting instruction to said non-contact IC card programmable read-write device 1, so as to set the parameter configuration in said non-contact IC card programmable read-write device 1. Said business executing module 6 is used to send an information interaction request to said server and said non-contact IC card programmable read-write device 1, so as to execute the business flow corresponding to said at least one application.

Preferably, in the system used for the non-contact security information interaction disclosed in the present invention, said business executing module 6 is further used to select the used application based on a candidate application list from said non-contact IC card programmable read-write device 1 when there are more than one applications, and to transmit the application identification corresponding to said application back to said non-contact IC card programmable read-write device 1.

Preferably, in the system used for the non-contact security information interaction disclosed in the present invention, said business executing module 6 is further used to execute an on-line processing when the used application is an on-line based application, and to transmit the on-line processing result to said non-contact IC card programmable read-write device 1.

Preferably, as shown in FIG. 1, in the system used for the non-contact security information interaction disclosed in the present invention, said non-contact IC card programmable read-write device 1 further comprises a parameter configuring module 3 and a business processing module 4. Said parameter configuring module 3 is used to analyze the received parameter setting instruction, and to complete the setting of said parameter configuration based on the analyzing result. Said business processing module 4 is used to analyze the received information interaction request, and to execute the business flow corresponding to said at least one application based on the analyzing result.

Preferably, as shown in FIG. 1, in the system used for the non-contact security information interaction disclosed in the present invention, said parameter configuring module 3 further comprises a parameter deleting unit 7 and a parameter adding unit 8. Said parameter deleting unit 7 is used to determine the mode of a deleting operation when said analyzing result for said parameter setting instruction indicates that the operation type is the deleting operation, and to complete the deleting operation based on the determining result. Said parameter adding unit 8 is used to complete an adding operation (i.e., adding the corresponding basic parameters) based on said analyzing result when said analyzing result for said parameter setting instruction indicates that the operation type is the adding operation.

Exemplarily, in the system used for the non-contact security information interaction disclosed in the present invention, said parameter deleting unit 7 is further used to delete the application identifications (AIDs) of the same application type when the mode of said deleting operation is the same type mode (i.e., deleting the application identifications (AIDs) of the same type).

Exemplarily, in the system used for the non-contact security information interaction disclosed in the present invention, said parameter deleting unit 7 is further used to delete single application identification (AID) when the mode of said deleting operation is a single mode (i.e., deleting single application identification (AID)).

Exemplarily, in the system used for the non-contact security information interaction disclosed in the present invention, when the mode of said deleting operation is the same type mode, said parameter deleting unit 7 deletes the corresponding parameters by way of "application identifications".

Exemplarily, in the system used for the non-contact security information interaction disclosed in the present invention, when the mode of said deleting operation is single mode, said parameter deleting unit 7 deletes the corresponding parameters by way of "application identification+AID length+AID data".

Preferably, as shown in FIG. 1, in the system used for the non-contact security information interaction disclosed in the present invention, said parameter adding unit 8 is further used to determine whether there are any other subsequent parameters (e.g. non-contact debit/credit payment parameters) based on said analyzing result for said parameter setting instruction, and to add the other subsequent parameters if there are said other subsequent parameters.

Preferably, as shown in FIG. 1, in the system used for the non-contact security information interaction disclosed in the present invention, said parameter adding unit 8 is further used to determine whether there are any other parameters customized by the equipment manufacturers (i.e., producers) based on said analyzing result for said parameter setting instruction, and to add the other parameters customized by the equipment manufacturers if there are said other parameters customized by the equipment manufacturers.

Preferably, as shown in FIG. 1, in the system used for the non-contact security information interaction disclosed in the present invention, said business executing module 6 further comprises a preprocessing unit 9 and a business processing unit 10. Said preprocessing unit 9 is used to determine whether there are more than one applications based on the analyzing result for the received information interaction request, and if there are more than one applications, then said preprocessing unit 9 transmits said candidate application list back to said terminal 2. Said business processing unit 10 is used to execute the corresponding business flow based on the application identifications corresponding to the used application from said terminal 2 and to determine the application type information, and to transmit said application type information to said terminal 2.

Preferably, in the system used for the non-contact security information interaction disclosed in the present invention, said business processing unit 10 is further used to execute an off-line business flow when said application type information indicates that the used application is an off-line application, and to transmit the executing result (e.g. the transaction is completed) back to said terminal 2.

Preferably, in the system used for the non-contact security information interaction disclosed in the present invention, said business processing unit 10 is further used to execute an on-line business flow based on the on-line processing result from said terminal 2 when said application type information indicates that the used application is an on-line based application, and to transmit the executing result (e.g. the transaction is completed) back to said terminal 2.

Preferably, in the system used for the non-contact security information interaction disclosed in the present invention, at least one of said processing flow identification numbers is associated with the type of said at least one application.

As shown in FIG. 1, the basic operational principle of the system used for the non-contact security information interaction disclosed in the present invention is as follows: said parameter setting module 5 sends a parameter setting instruction to a non-contact IC card programmable read-write device 1, so as to set the parameter configuration in said non-contact IC card programmable read-write device 1; said parameter configuring module 3 analyzes the received parameter setting instruction, and completes the setting of a parameter configuration based on the analyzing result; said business executing module 6 sends an information interaction request to said server and said non-contact IC card programmable read-write device 1, so as to execute the business flow corresponding to said at least one application; and said business processing module 4 analyzes the received information interaction request, and executes the business flow corresponding to said at least one application based on the analyzing result.

From the above, in the system used for the non-contact security information interaction disclosed in the present invention, it is possible to set multiple sets of parameters for different applications in said non-contact IC card programmable read-write device 1 according to business requirements (for example, in the financial field, according to the business requirements, it is possible to set the parameters which is specific to electronic cash application in said non-contact IC card programmable read-write device, and it is also possible to set the parameters of non-contact debit/credit applications).

Figure 2:
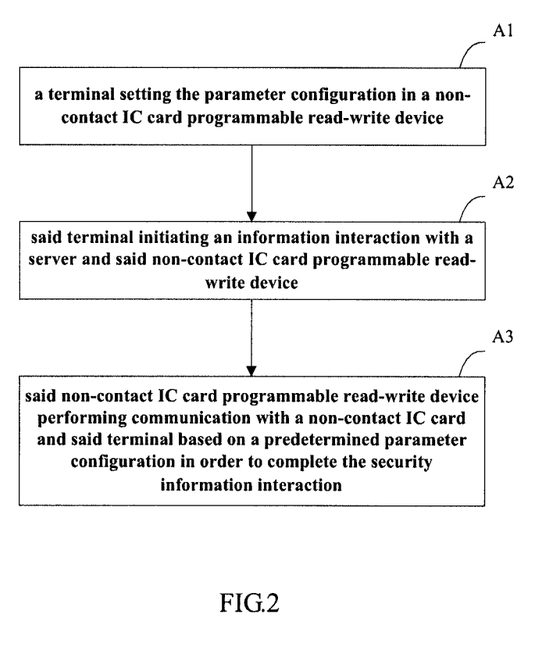
FIG. 2 is a flow diagram of the method used for the non-contact security information interaction according to an embodiment of the present invention.

FIG. 2 is a flow diagram of a method used for the non-contact security information interaction according to an embodiment of the present invention. As shown in FIG. 2, the method used for the non-contact security information interaction disclosed in the present invention comprises the following steps: (A1) a terminal setting a parameter configuration in a non-contact IC card programmable read-write device; (A2) said terminal initiating an information interaction with a server and said non-contact IC card programmable read-write device; and (A3) said non-contact IC card programmable read-write device performing communication with a non-contact IC card and said terminal based on a predetermined parameter configuration in order to complete the security information interaction.

As shown in FIG. 2, in the method used for the non-contact security information interaction disclosed in the present invention, preferably, said parameter configuration corresponds to at least one application.

As shown in FIG. 2, in the method used for the non-contact security information interaction disclosed in the present invention, exemplarily, said parameter configuration corresponds to at least two applications.

As shown in FIG. 2, in the method used for the non-contact security information interaction disclosed in the present invention, exemplarily, one of said at least two applications is an on-line based application (e.g. a non-contact debit/credit payment application).

As shown in FIG. 2, in the method used for the non-contact security information interaction disclosed in the present invention, preferably, said non-contact IC card programmable read-write device is capable of performing the information interaction with said terminal more than once.

As shown in FIG. 2, in the method used for the non-contact security information interaction disclosed in the present invention, preferably, said non-contact IC card programmable read-write device and said terminal use processing flow identification numbers to identify each of information data processing sub-flows executed in said non-contact IC card programmable read-write device and said terminal.

As shown in FIG. 2, in the method used for the non-contact security information interaction disclosed in the present invention, preferably, said non-contact IC card programmable read-write device and said terminal complete the business logic judgement associated with said at least one application and the information interaction between each other based on said processing flow identification numbers.

As shown in FIG. 2, in the method used for the non-contact security information interaction disclosed in the present invention, said step (A1) further comprises: said terminal sending a parameter setting instruction to said non-contact IC card programmable read-write device, so as to set the parameter configuration in said non-contact IC card programmable read-write device.

As shown in FIG. 2, in the method used for the non-contact security information interaction disclosed in the present invention, said step (A2) further comprises: said terminal sending an information interaction request to said server and said non-contact IC card programmable read-write device, so as to execute the business flow corresponding to said at least one application.

As shown in FIG. 2, in the method used for the non-contact security information interaction disclosed in the present invention, preferably, said step (A2) further comprises: selecting the used application based on a candidate application list from said non-contact IC card programmable read-write device when there are more than one applications, and transmitting the application identification corresponding to said application back to said non-contact IC card programmable read-write device.

As shown in FIG. 2, in the method used for the non-contact security information interaction disclosed in the present invention, preferably, said step (A2) further comprises: executing an on-line processing when the used application is an on-line based application, and transmitting the on-line processing result to said non-contact IC card programmable read-write device.

As shown in FIG. 2, in the method used for the non-contact security information interaction disclosed in the present invention, preferably, said step (A3) further comprises: (B1) said non-contact IC card programmable read-write device analyzing the received parameter setting instruction, and completing the setting of said parameter configuration based on the analyzing result; and (B2) said non-contact IC card programmable read-write device analyzing the received information interaction request, and executing the business flow corresponding to said at least one application based on the analyzing result.

As shown in FIG. 2, in the method used for the non-contact security information interaction disclosed in the present invention, preferably, said step (B 1) further comprises: (C1) determining the mode of a deleting operation when said analyzing result for said parameter setting instruction indicates that the operation type is the deleting operation, and completing the deleting operation based on the determining result; and (C2) completing an adding operation (i.e., adding the corresponding basic parameters) based on said analyzing result when said analyzing result for said parameter setting instruction indicates that the operation type is the adding operation.

As shown in FIG. 2, in the method used for the non-contact security information interaction disclosed in the present invention, exemplarily, said step (C1) further comprises: deleting the application identifications (AIDs) of the same application type when the mode of said deleting operation is the same type mode (i.e., deleting the application identifications (AIDs) of the same type).

As shown in FIG. 2, in the method used for the non-contact security information interaction disclosed in the present invention, exemplarily, said step (C1) further comprises: deleting single application identification (AID) when the mode of said deleting operation is a single mode (i.e., deleting single application identification (AID)).

As shown in FIG. 2, in the method used for the non-contact security information interaction disclosed in the present invention, exemplarily, said step (C1) further comprises: when the mode of said deleting operation is the same type mode, deleting the corresponding parameters by way of "application identifications".

As shown in FIG. 2, in the method used for the non-contact security information interaction disclosed in the present invention, exemplarily, said step (C1) further comprises: when the mode of said deleting operation is single mode, deleting the corresponding parameters by way of "application identification+AID length+AID data".

As shown in FIG. 2, in the method used for the non-contact security information interaction disclosed in the present invention, preferably, said step (C2) further comprises: determining whether there are any other subsequent parameters (e.g. non-contact debit/credit payment parameters) based on said analyzing result for said parameter setting instruction, and adding the other subsequent parameters if there exist said other subsequent parameters.

As shown in FIG. 2, in the method used for the non-contact security information interaction disclosed in the present invention, preferably, said step (C2) further comprises: determining whether there are any other parameters customized by the equipment manufacturers (i.e., producers) based on said analyzing result for said parameter setting instruction, and adding the other parameters customized by the equipment manufacturers if there exist said other parameters customized by the equipment manufacturers.

As shown in FIG. 2, in the method used for the non-contact security information interaction disclosed in the present invention, preferably, said step (B2) further comprises: (D1) determining whether there are more than one applications based on the analyzing result for the received information interaction request, and if there exist more than one applications, then transmitting said candidate application list back to said terminal; (D2) executing the corresponding business flow based on the application identification corresponding to the used application from said terminal and determining an application type information, and transmitting said application type information to said terminal.

As shown in FIG. 2, in the method used for the non-contact security information interaction disclosed in the present invention, preferably, said step (D2) further comprises: executing an off-line business flow when said application type information indicates that the used application is an off-line application, and transmitting the executing result (e.g. the transaction is completed) back to said terminal.

As shown in FIG. 2, in the method used for the non-contact security information interaction disclosed in the present invention, preferably, said step (D2) further comprises: executing an on-line business flow based on the on-line processing result from said terminal when said application type information indicates that the used application is an on-line based application, and transmitting the executing result (e.g. the transaction is completed) back to said terminal.

As shown in FIG. 2, in the method used for the non-contact security information interaction disclosed in the present invention, preferably, at least one of said processing flow identification numbers is associated with the type of said at least one application.

From the above, in the method used for the non-contact security information interaction disclosed in the present invention, it is possible to set multiple sets of parameters for different applications in said non-contact IC card programmable read-write device according to business requirements (for example, in the financial field, according to the business requirements, it is possible to set the parameters which is specific to electronic cash application in said non-contact IC card programmable read-write device, and it is also possible to set the parameters of non-contact debit/credit applications).

Although the present invention is described by way of the preferred implementation described above, but its realization form is not limited to the above implementation. It should be recognized that various changes and modifications can be made to the present invention by one skilled in the art without departing from the spirit and scope of the invention.

What is claimed is:
1. A system used for a non-contact security information interaction comprising:
   a terminal for setting a parameter configuration in a non-contact IC card programmable read-write device, and initiating an information interaction with a server and said non-contact IC card programmable read-write device;
   said non-contact IC card programmable read-write device for performing communication with a non-contact IC card and said terminal based on a predetermined parameter configuration in order to complete the security information interaction,
   wherein said non-contact IC card programmable read-write device performs the information interaction with said terminal more than once.

2. A non-contact IC card programmable read-write device comprising:
   a parameter configuring module for analyzing the received parameter setting instruction from a terminal, and completing the setting of a parameter configuration based on the analyzing result; and
   a business processing module for analyzing a received information interaction request from the terminal, and executing a business flow corresponding to at least one application based on the analyzing result and a predetermined parameter configuration,
   wherein said non-contact IC card programmable read-write device performs the information interaction with said terminal more than once.

3. A method used for a non-contact security information interaction, said method used for the non-contact security information interaction comprising the following steps:
   (A1) a terminal setting a parameter configuration in a non-contact IC card programmable read-write device;
   (A2) said terminal initiating an information interaction with a server and said non-contact IC card programmable read-write device; and
   (A3) said non-contact IC card programmable read-write device performing communication with a non-contact IC card and said terminal based on a predetermined parameter configuration in order to complete the security information interaction,
   wherein said non-contact IC card programmable read-write device performs the information interaction with said terminal more than once.

4. The method used for the non-contact security information interaction as claimed in claim 3, wherein said parameter configuration corresponds to at least two applications.

5. The method used for the non-contact security information interaction as claimed in claim 4, wherein one of said at least two applications is an on-line based application.

6. The method used for the non-contact security information interaction as claimed in claim 3, wherein said non-contact IC card programmable read-write device and said terminal use processing flow identification numbers to identify each of information data processing sub-flows executed in said non-contact IC card programmable read-write device and said terminal.

7. The method used for the non-contact security information interaction as claimed in claim 6, wherein said non-contact IC card programmable read-write device and said terminal complete the business logic judgement associated with said at least one application and the information interaction between each other based on said processing flow identification numbers.

8. The method used for the non-contact security information interaction as claimed in claim 7, wherein said step (A1) further comprises: said terminal sending a parameter setting instruction to said non-contact IC card programmable read-write device, so as to set the parameter configuration in said non-contact IC card programmable read-write device.

9. The method used for the non-contact security information interaction as claimed in claim 8, wherein said step (A2) further comprises: said terminal sending an information interaction request to said server and said non-contact IC card programmable read-write device, so as to execute the business flow corresponding to said at least one application.

10. The method used for the non-contact security information interaction as claimed in claim 9, wherein said step (A2) further comprises: selecting the used application based on a candidate application list from said non-contact IC card programmable read-write device when there exist more than one applications, and transmitting the application identification corresponding to said application back to said non-contact IC card programmable read-write device.

11. The method used for the non-contact security information interaction as claimed in claim 10, wherein said step (A2) further comprises: executing an on-line processing when the used application is an on-line based application, and transmitting the on-line processing result to said non-contact IC card programmable read-write device.

12. The method used for the non-contact security information interaction as claimed in claim 11, wherein said step (A3) further comprises:
  (BI) said non-contact IC card programmable read-write device analyzing the received parameter setting instruction, and completing the setting of said parameter configuration based on the analyzing result; and
  (82) said non-contact IC card programmable read-write device analyzing the received information interaction request, and executing the business flow corresponding to said at least one application based on the analyzing result.

13. The method used for the non-contact security information interaction as claimed in claim 12, wherein said step (BI) further comprises:
  (CI) determining the mode of a deleting operation when said analyzing result for said parameter setting instruction indicates that the operation type is the deleting operation, and completing the deleting operation based on the determining result; and
  (C2) completing an adding operation based on said analyzing result when said analyzing result for said parameter setting instruction indicates that the operation type is the adding operation.

14. The method used for the non-contact security information interaction as claimed in claim 13, wherein said step (CI) further comprises: deleting the application identifications of the same application type when the mode of said deleting operation is the same type mode.

15. The method used for the non-contact security information interaction as claimed in claim 14, wherein said step (C 1) further comprises: deleting single application identification when the mode of said deleting operation is a single mode.

16. The method used for the non-contact security information interaction as claimed in claim 15, wherein said step (C2) further comprises: determining whether there exist any other subsequent parameters based on said analyzing result for said parameter setting instruction, and adding the other subsequent parameters if there exist said other subsequent parameters.

17. The method used for the non-contact security information interaction as claimed in claim 16, wherein said step (C2) further comprises: determining whether there exist any other parameters customized by the equipment manufacturers based on said analyzing result for said parameter setting instruction, and adding the other parameters customized by the equipment manufacturers if there exist said other parameters customized by the equipment manufacturers.

18. The method used for the non-contact security information interaction as claimed in claim 17, wherein said step (B2) further comprises:
  (DI) determining whether there exist more than one applications based on the analyzing result for the received information interaction request, and if there exist more than one applications, then transmitting said candidate application list back to said terminal; and
  (02) executing the corresponding business flow based on the application identifications corresponding to the used application from said terminal and determining the application type information, and transmitting said application type information to said terminal.

19. A terminal used for the non-contact security information interaction comprising:
  a parameter setting module for sending a parameter setting instruction to a non-contact IC card programmable read-write device, so as to set the parameter configuration in said non-contact IC card programmable read-write device; and
  a business executing module for sending an information interaction request to a server and said non-contact IC card programmable read-write device, so as to execute a business flow corresponding to at least one application,
  wherein said non-contact IC card programmable read-write device receives the information interaction from said business executing module of said terminal more than once.

* * * * *